(12) United States Patent
Tojo et al.

(10) Patent No.: US 11,509,398 B2
(45) Date of Patent: Nov. 22, 2022

(54) CONTROL APPARATUS AND CONTROL METHOD

(71) Applicant: Nippon Telegraph and Telephone Corporation, Tokyo (JP)

(72) Inventors: Takuya Tojo, Tokyo (JP); Shingo Okada, Tokyo (JP); Seisho Yasukawa, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/291,867

(22) PCT Filed: Nov. 7, 2019

(86) PCT No.: PCT/JP2019/043622
§ 371 (c)(1),
(2) Date: May 6, 2021

(87) PCT Pub. No.: WO2020/095982
PCT Pub. Date: May 14, 2020

(65) Prior Publication Data
US 2022/0014275 A1 Jan. 13, 2022

(30) Foreign Application Priority Data
Nov. 8, 2018 (JP) .............................. JP2018-210889

(51) Int. Cl.
*H04B 10/00* (2013.01)
*H04B 10/572* (2013.01)
(Continued)

(52) U.S. Cl.
CPC ........... *H04B 10/572* (2013.01); *H04B 10/27* (2013.01); *H04J 14/02* (2013.01); *H04J 14/0278* (2013.01)

(58) Field of Classification Search
CPC .... H04B 10/572; H04B 10/27; H04B 10/075; H04B 10/0791; H04J 14/02;
(Continued)

(56) References Cited

U.S. PATENT DOCUMENTS

2010/0017837 A1* 1/2010 Miura .................... H04N 7/165
725/116
2013/0195460 A1* 8/2013 Kadohata ............ H04J 14/0257
398/79
(Continued)

FOREIGN PATENT DOCUMENTS

JP 2012-109928 6/2012

*Primary Examiner* — Hibret A Woldekidan
(74) *Attorney, Agent, or Firm* — Fish & Richardson P.C.

(57) ABSTRACT

A control apparatus includes an optical wavelength change control unit that specifies, in response to a request to change a wavelength band of a first optical wavelength path used by a first transmission apparatus and a second transmission apparatus to a wavelength band of a second optical wavelength path, a first route between routers which is affected by the request and a service which uses the first route and that specifies a second route between the routers which detours the specified service; a router control unit that transmits a request to detour the specified service to the second route, to a start-point router and an end-point router on the first route; and a transmission apparatus control unit that transmits a request to change the wavelength band of the first optical wavelength path to the wavelength band of the second optical wavelength path, to the first transmission apparatus and the second transmission apparatus.

10 Claims, 7 Drawing Sheets

(51) Int. Cl.
*H04B 10/27* (2013.01)
*H04J 14/02* (2006.01)

(58) Field of Classification Search
CPC ............... H04J 14/0278; H04J 14/0291; H04J 14/0294; H04J 14/0295; H04J 14/0297; H04Q 11/0005; H04Q 2011/0043; H04Q 2011/0081; H04Q 3/0075; H04Q 3/0079
USPC ...................................................... 398/1–5, 7
See application file for complete search history.

(56) References Cited

U.S. PATENT DOCUMENTS

| | | | | |
|---|---|---|---|---|
| 2016/0352452 | A1* | 12/2016 | Takeshita | H04J 14/0263 |
| 2017/0230113 | A1* | 8/2017 | Takita | H04B 10/07953 |
| 2017/0279556 | A1* | 9/2017 | Nakagawa | H04J 14/0256 |
| 2018/0239522 | A1* | 8/2018 | Campbell | H04B 10/27 |
| 2019/0037288 | A1* | 1/2019 | Fujisawa | H04J 14/0257 |
| 2019/0190819 | A1* | 6/2019 | Choudhury | H04L 47/2441 |
| 2020/0137468 | A1* | 4/2020 | Schimpe | H04B 10/27 |

\* cited by examiner

Fig. 5

| SERVICE NAME | SEGMENT LIST NAME 1 | SEGMENT LIST NAME 2 |
|---|---|---|
| VPN1 | A-to-B-1 | B-to-A-1 |

Fig. 6

| SEGMENT LIST NAME | START-POINT ROUTER | END-POINT ROUTER | SEGMENT LIST | OPTICAL WAVELENGTH PATH ID |
|---|---|---|---|---|
| A-to-B-1 | ROUTER A | ROUTER B | 100 | 1,2 |
| B-to-A-1 | ROUTER B | ROUTER A | 100 | 1,2 |
| A-to-B-2 | ROUTER A | ROUTER B | 101 | 3 |
| B-to-A-2 | ROUTER B | ROUTER A | 101 | 3 |

Fig. 7

| OPTICAL WAVELENGTH PATH ID | TRANSMISSION APPARATUS 1 | | | TRANSMISSION APPARATUS 2 | | |
|---|---|---|---|---|---|---|
| | TRANSMISSION APPARATUS NAME | PORT | WAVELENGTH | TRANSMISSION APPARATUS NAME | PORT | WAVELENGTH |
| 1 | TRANSMISSION APPARATUS A | 1 | $\lambda 1$ | TRANSMISSION APPARATUS B | 1 | $\lambda 1$ |
| 2 | TRANSMISSION APPARATUS B | 2 | $\lambda 2$ | TRANSMISSION APPARATUS D | 1 | $\lambda 2$ |
| 3 | TRANSMISSION APPARATUS A | 2 | $\lambda 3$ | TRANSMISSION APPARATUS D | 2 | $\lambda 3$ |

Fig. 8

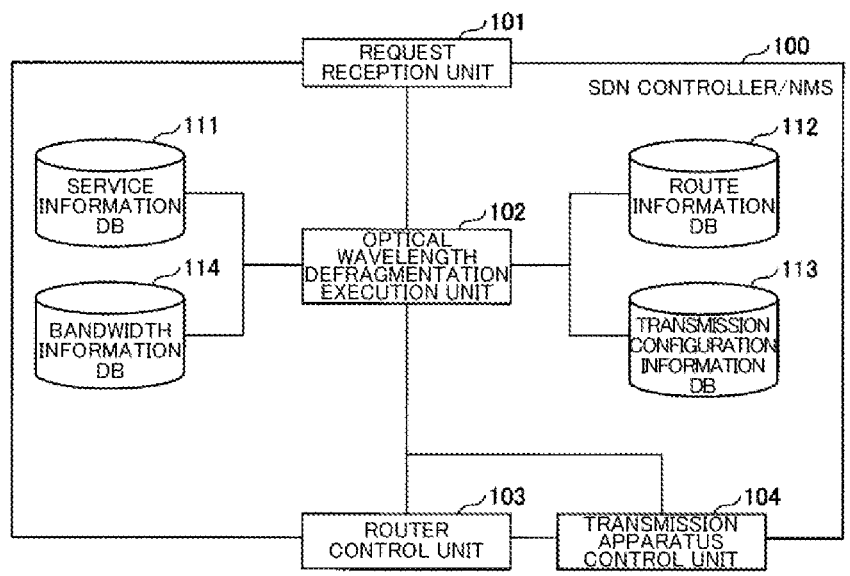

Fig. 9

| SID | LINE BANDWIDTH | AVAILABLE BANDWIDTH |
|---|---|---|
| 100 | 10G | 5G |
| 101 | 10G | 5G |

Fig. 10

| SERVICE NAME | SEGMENT LIST NAME 1 | SEGMENT LIST NAME 2 | USED BANDWIDTH |
|---|---|---|---|
| VPN1 | A-to-B-1 | B-to-A-1 | 1G |

Fig. 11

| OPTICAL WAVELENGTH PATH ID | TRANSMISSION APPARATUS 1 | | | TRANSMISSION APPARATUS 2 | | | TRANSMISSION ROUTE GROUP |
|---|---|---|---|---|---|---|---|
| | TRANSMISSION APPARATUS NAME | PORT | WAVELENGTH | TRANSMISSION APPARATUS NAME | PORT | WAVELENGTH | |
| 1 | TRANSMISSION APPARATUS A | 1 | λ1 | TRANSMISSION APPARATUS B | 1 | λ1 | 2 |
| 2 | TRANSMISSION APPARATUS B | 2 | λ2 | TRANSMISSION APPARATUS D | 1 | λ2 | 2 |
| 3 | TRANSMISSION APPARATUS A | 2 | λ3 | TRANSMISSION APPARATUS D | 2 | λ3 | 1 |

Fig. 12

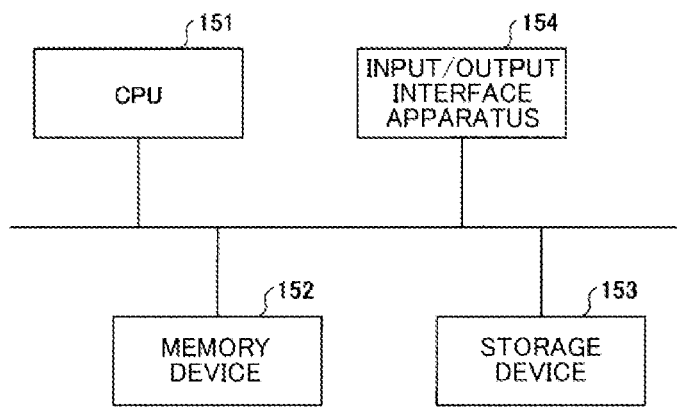

CONTROL APPARATUS AND CONTROL METHOD

CROSS-REFERENCE TO RELATED APPLICATIONS

This application is a National Stage application under 35 U.S.C. § 371 of International Application No. PCT/JP2019/043622, having an International Filing Date of Nov. 7, 2019, which claims priority to Japanese Application Serial No. 2018-210889, filed on Nov. 8, 2018. The disclosure of the prior application is considered part of the disclosure of this application, and is incorporated in its entirety into this application.

TECHNICAL FIELD

The present invention relates to a control apparatus and a control method.

BACKGROUND ART

The increasing sophistication of transmission apparatuses has led to a wide spread of CDC-ROADMs (Colorless, Directionless and Contentionless-Reconfigurable Optical Add/Drop Multiplexers)/CD-ROADMs (Colorless and Directionless-Reconfigurable Optical Add/Drop Multiplexers) having a directionless function capable of dynamically selecting a desired directional path for an optical wavelength input to and output from a transmission apparatus. Since an optical wavelength can be made to pass through a desired route in the optical networks using such ROADMs, the optical networks can be flexibly operated. As a result, an available wavelength can be selected from among a plurality of routes, and optical wavelengths can be immediately provided in accordance with a demand.

However, it has been pointed out that, repeating the operations of providing optical wavelengths and collecting unnecessary optical wavelengths creates a state in which a different wavelength is used in each section of the optical network, namely, a fragmented state (fragmentation) is created. In the optical network in the fragmented state, it is difficult to secure an optical wavelength across a plurality of sections. This degrades the use efficiency of the optical network.

To solve these problems, there has been proposed a technique called "optical wavelength defragmentation" that resolves fragmentation of the optical wavelength. The optical wavelength defragmentation resolves a fragmented state of the optical network by changing an optical wavelength band being used to a different wavelength band. However, the optical wavelength defragmentation has a problem in that, when the optical wavelength is changed to a different wavelength band, a client signal is instantaneously interrupted.

To prevent such instantaneous interruption, a technique in which a signal from an upper layer is replicated in a transmission apparatus, and while the optical wavelength band is being changed, communication is continued by using an optical wavelength at the replication destination has been discussed (see PTL 1).

CITATION LIST

Patent Literature

[PTL 1] Japanese Patent Application Publication No. 2012-109928

SUMMARY OF THE INVENTION

Technical Problem

In accordance with the method for realizing optical wavelength defragmentation without instantaneous interruption described in PTL 1, the function of replicating a signal from the upper layer needs to be provided to a transmission apparatus. Such a function is not a common function. Therefore, the cost of the apparatus increases, which is a problem.

In addition, a subcarrier including a plurality of optical wavelengths may be provided between the transmission apparatuses, and when the amount of data is reduced, the wavelength band of a part of the optical wavelengths in the subcarrier may be changed. In that case, however, the subcarrier needs to be configured in advance. This means that this method cannot be applied to a single optical wavelength, which is a problem.

An object of the present invention is to realize optical wavelength defragmentation without the need to provide a special function such as replicating a signal in a transmission apparatus.

Means for Solving the Problem

A control apparatus according to one aspect of the present invention is used in a communication network including a plurality of routers and a plurality of transmission apparatuses for connecting between the plurality of routers, the control apparatus including: an optical wavelength change control unit that specifies, in response to a request to change a wavelength band of a first optical wavelength path used by a first transmission apparatus and a second transmission apparatus among the plurality of transmission apparatuses to a wavelength band of a second optical wavelength path, a first route between routers which is affected by the request and a service which uses the first route and that specifies a second route between the routers which detours the specified service; a router control unit that transmits a request to detour the specified service to the second route, to a start-point router and an end-point router on the first route among the plurality of routers; and a transmission apparatus control unit that transmits a request to change the wavelength band of the first optical wavelength path to the wavelength band of the second optical wavelength path, to the first transmission apparatus and the second transmission apparatus.

In addition, a control method according to one aspect of the present invention is performed by a control apparatus that is used in a communication network including a plurality of routers and a plurality of transmission apparatuses for connecting between the plurality of routers, the control method including the steps of: specifying, in response to a request to change a wavelength band of a first optical wavelength path used by a first transmission apparatus and a second transmission apparatus among the plurality of transmission apparatuses to a wavelength band of a second optical wavelength path, a first route between routers which is affected by the request and a service which uses the first route and specifying a second route between the routers which detours the specified service; transmitting a request to detour the specified service to the second route, to a start-point router and an end-point router on the first route among the plurality of routers; and transmitting a request to change the wavelength band of the first optical wavelength path to the wavelength band of the second optical wavelength path, to the first transmission apparatus and the second transmission apparatus.

Effects of the Invention

According to the present invention, optical wavelength defragmentation can be realized without the need to provide a special function such as replicating a signal in a transmission apparatus.

BRIEF DESCRIPTION OF DRAWINGS

FIG. 5 illustrates an example of service information held is a service information DB.

FIG. 6 illustrates an example of route information held is a route information DB.

FIG. 7 illustrates an example of transmission configuration information held in a transmission configuration information DB.

FIG. 8 is a block configuration diagram illustrating an SDN controller/NMS according to a second embodiment of the present invention.

FIG. 9 illustrates as example of bandwidth information held in a bandwidth information DB.

FIG. 10 illustrates an example of service information held is a service information DB.

FIG. 11 illustrates an example of transmission configuration information held in a transmission configuration information DB.

FIG. 12 is an example of a hardware configuration of an SDN controller/NMS according to an embodiment of the present invention.

DESCRIPTION OF EMBODIMENTS

Hereinafter, an embodiment of the present invention will be described based on the drawings.

In the embodiment of the present invention, a control apparatus that controls routers and transmission apparatuses to realize optical wavelength defragmentation without instantaneous interruption by using a common transmission apparatus that does not have a special function.

Figure 1:
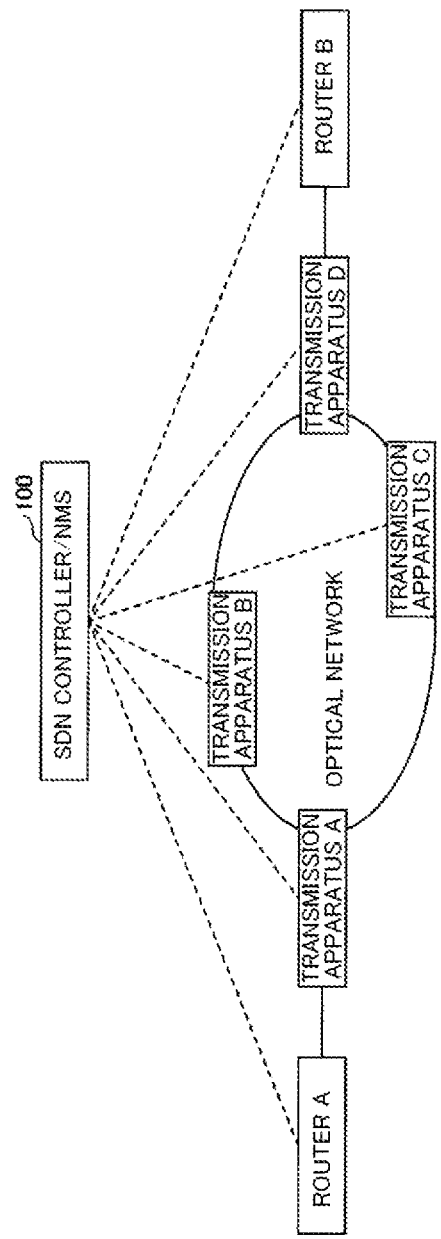
FIG. 1 illustrates a configuration of an IP/transmission network according to an embodiment of the present invention.

FIG. 1 illustrates a configuration of an IP (Internet Protocol)/transmission network according to the embodiment of the present invention. As illustrated in FIG. 1, the IP/transmission network includes routers A and B and transmission apparatuses A, B, C, and D. The transmission network (hereinafter, referred to as the optical network) is formed by the transmission apparatuses A, B, C, and D, and the IP network is formed by connecting the routers A and B to the optical network. An SDN (Software Defined Network) controller/NMS (Network Management System) 100 is an example of a control apparatus that controls the routers and the transmission apparatuses. In the present embodiment, the control apparatus that controls the routers and the transmission apparatuses is referred to as the SDN controller/NMS 100. However, the SDN controller/NMS 100 may be a control apparatus having functions of both the SDN controller and the NMS. Alternatively, the SDN controller/NMS 100 may be a control apparatus having a function of only the SDN controller or a control apparatus having a function of only the NMS. Alternatively, the SDN controller/NMS 100 may be another control apparatus that is independent of the SDN controller and the NMS. While FIG. 1 illustrates two routers and four transmission apparatuses, any number of routers and transmission apparatuses may be used to form the IP/transmission network.

The optical network is assumed to be formed by the transmission apparatuses such as a CDC-ROADM that can dynamically change a wavelength band of an optical wavelength path. However, if the wavelength band of an optical wavelength path can dynamically be changed, the present embodiment is also applicable to a configuration in which points are connected in a one-to-one correspondence by using only a transponder. In addition, the routers can control routes by using segment routing or the like. However, if the router can control the routes, the present embodiment is also applicable to a case in which MPLS (Multi-Protocol Label Switching) or IP routing is used.

Figure 2:
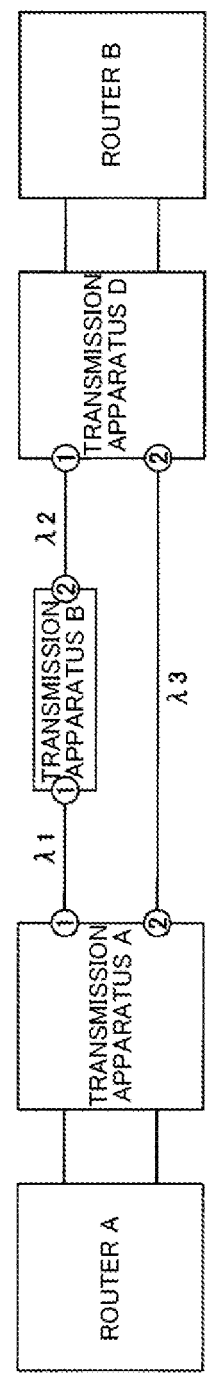
FIG. 2 illustrates a configuration example of physical connections of apparatuses and a configuration example of optical wavelengths.

FIG. 2 illustrates a configuration example of physical connections of the apparatuses and a configuration example of optical wavelengths. The optical wavelength paths are set between the transmission apparatuses. The routers communicate with each other by using the optical wavelength paths between the transmission apparatuses. As an example, the following three optical wavelength paths are assumed to be set. The first is an optical wavelength path (optical wavelength path ID=1) that uses a wavelength band $\lambda 1$ between a physical port 1 of the transmission apparatus A and a physical port 1 of the transmission apparatus B. The second is an optical wavelength path (optical wavelength path ID=2) that uses a wavelength band $\lambda 2$ between a physical port 2 of the transmission apparatus B and a physical port 1 of the transmission apparatus D. The third is an optical wavelength path (optical wavelength path ID=3) that uses a wavelength band $\lambda 3$ between a physical port 2 of the transmission apparatus A and a physical port 2 of the transmission apparatus D.

Figure 3:
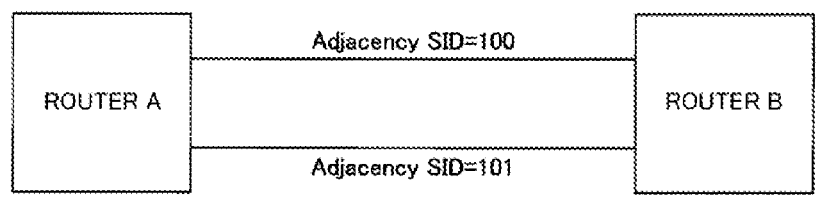
FIG. 3 illustrates an example of route control between routers.

FIG. 3 illustrates an example of route control between the routers. The following example assumes that a plurality of routes can be set between the routers, and in accordance with an instruction from the SDN controller/NMS 100, the route to be used between the routers can be selected. As an example, the router A and the router B are connected to each other via two routes as illustrated in FIG. 3, and the route to be used can be selected in accordance with an instruction from the SDN controller/NMS 100. For example, when segment routing is used, an SID (segment ID) used in the segment routing is set to a link as an adjacency SID. By specifying a route used by an LSP (Label Switched Path) by using SIDs, the SDN controller/NMS 100 can control the communication path for each VPN (Virtual Private Network). Examples of the setting of SIDs in the router include setting in accordance with a standard protocol such as the NETCONF (Network Configuration Protocol)/YANG (Yet Another Next Generation) and the PCEP (Path Computation Element Protocol) and setting in accordance with the CLI (Command Line Interface).

When performing the optical wavelength defragmentation, the SDN controller/NMS 100 temporarily detours the route of a service using the optical wavelength to be an optical wavelength defragmentation target to a different route in the IP layer by controlling the routers so as to avoid being affected by communication interruption due to the optical wavelength defragmentation. For example, when performing the optical wavelength defragmentation that changes the wavelength band of the optical wavelength path between the transmission apparatus A and the transmission apparatus B in FIG. 2 from λ1 to λ2, the SDN controller/INS 100 detours the route of the service between the routers A and B that uses λ1 to a different route in the IP layer. The different route here refers to a route between the routers A and B that uses a wavelength band λ3 of the optical wavelength path between the transmission apparatus A and the transmission apparatus D.

Next, the SDN controller/NMS 100 changes the wavelength band of the optical wavelength to perform the optical wavelength defragmentation by controlling the transmission apparatuses and switches the route of the service back to the original route by controlling the routers again. For example, after detouring the route between the routers A and B that uses λ1, the SDN controller/NMS 100 changes the wavelength band of the optical wavelength path between the transmission apparatus A and the transmission apparatus B to λ2. Subsequently, the SDN controller/NMS 100 switches the route between the routers A and B back to the original route. As described above, the SDN controller/NMS 100 controls the routers to preliminarily change the route. In this way, the optical wavelength defragmentation can be realized without having an impact of communication interruption on the service. In addition, since there is no need to provide a special function to the transmission apparatuses, the optical wavelength defragmentation can be realized at a low cost. Furthermore, since there is no need to configure a subcarrier with a plurality of optical wavelengths, the present invention is applicable to a case in which a single optical wavelength is used.

First Embodiment

Figure 4:
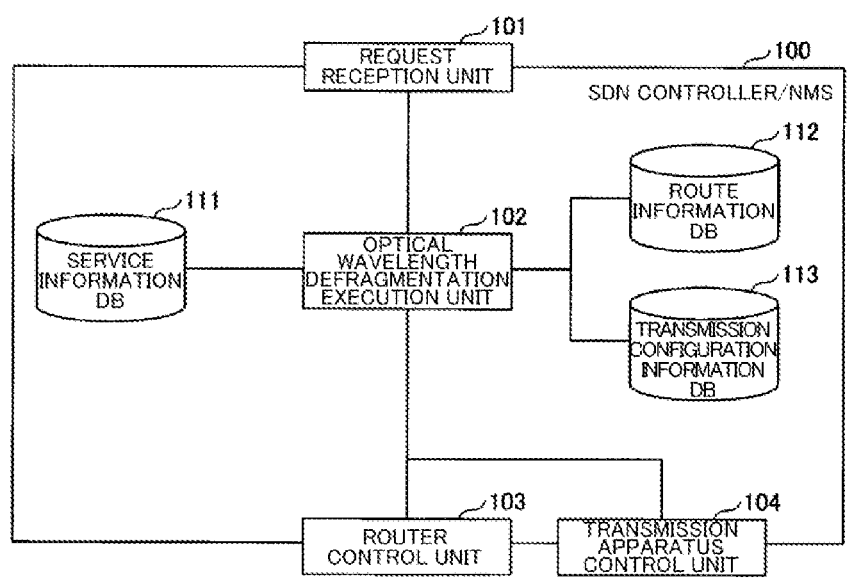
FIG. 4 is a block configuration diagram illustrating an SDN controller/NMS according to a first embodiment of the present invention.

FIG. 4 illustrates a block configuration diagram illustrating an SDN controller/NMS 100 according to a first embodiment of the present invention. The SDN controller/NMS 100 includes a request reception unit 101 as a functional unit, an optical wavelength defragmentation execution unit 102, a router control unit 103, and a transmission apparatus control unit 104. In addition, the SDN controller/NMS 100 includes a service information DB 111 as a storage unit, a route information DB 112, and a transmission configuration information DB 113.

The service information DB 111 is a storage unit that manages a correspondence between a route (segment list) set between routers and a service using the route. For example, when there is a service VPN 1 that uses a route "Adjacency SID=100" between routers A and B in an example illustrated in FIG. 3, the service information DB 111 holds correspondence between the service and the segment list as illustrated in FIG. 5. In the segment routing, a route is specified for each direction. Therefore, a set of two routes needs to be specified for a bi-directional communication service, and the service information DB 111 holds two routes for each bi-directional communication service.

The route information DB 112 is a storage unit that manages a correspondence between a route (segment list) set between routers and an optical wavelength path used on the route. For example, in the following case, the route information DB 112 holds start-point routers, end-point routers, segment lists, and wavelength path IDs as illustrated in FIG. 6. The following case means a case in which an adjacency SID=100 is set to an optical wavelength path ID=1 between the transmission apparatuses A and B and an optical wavelength path ID=2 between the transmission apparatuses B and D, and an adjacency SID=101 is set to an optical wavelength path ID=3 between the transmission apparatuses A and D in the examples illustrated in FIGS. 2 and 3. In this case, too, since the segment routing specifies a route for each individual direction, a set of two routes needs to be specified for a bi-directional communication service. Accordingly, the route information DB 112 holds the routes corresponding to the both directions. While FIG. 6 illustrates a case in which the individual segment list includes a single segment, the segment list includes a plurality of SIDs if a plurality of segments exists between routers.

The transmission configuration information DB 113 is a storage unit that manages information about an optical wavelength path set between the transmission apparatuses. For example, the transmission configuration information DB 113 holds connection information about a physical configuration as illustrated in FIG. 2, such as the transmission apparatuses at the both ends, ports, and wavelength bands, for each optical wavelength path in a format as illustrated in FIG. 7.

The request reception unit 101 receives a request to change a wavelength band of a specific optical wavelength path when the optical wavelength defragmentation is determined to be needed. For example, the request reception unit 101 receives a request to change a wavelength band λ1 of an optical wavelength path to a wavelength band λ2 in a section between the transmission apparatus A and the transmission apparatus B illustrated in FIG. 2. The request reception unit 101 may receive the request from the outside of the SDN controller/NMS 100 or the request based on a result of a calculation performed by using an algorithm preset in the SDN controller/NMS 100. For example, based on a determination that a state of fragmentation has exceeded a threshold, the request reception unit 101 may receive the request to change a wavelength band of an optical wavelength path.

The optical wavelength defragmentation execution unit 102 specifies a route between routers that are affected by the request received by the request reception unit 101 and a service that uses the route. Specifically, the optical wavelength defragmentation execution unit 102 searches the transmission configuration information DB 113 for an optical wavelength path whose wavelength band has been requested to be changed. The transmission configuration information in FIG. 7 indicates that an optical wavelength path ID=1 uses λ1 in the section between the transmission apparatus A and the transmission apparatus B. Next, the optical wavelength defragmentation execution unit 102 searches the route information DB 112 and specifies a route that uses the optical wavelength path ID. The target communication is a segment list associated with the optical wavelength path ID=1, and the route information in FIG. 6 indicates that the target communication is A-to-B-1 and B-to-A-1. In addition, the optical wavelength defragmentation execution unit 102 searches the service information DB 111 and specifies a service using the specified segment list. The service information in FIG. 5 indicates that the service using the specified segment list is VPN 1.

An object of the present embodiment is to change the wavelength band of the optical wavelength path without affecting the service. Therefore, the service that would be affected by the change is moved to a different optical wavelength path so as to eliminate the impact of the communication interruption that occurs when the wavelength band is changed. The optical wavelength defragmentation execution unit 102 specifies a route that can detour the service between the routers from the route information DB 112. Specifically, the optical wavelength defragmentation execution unit 102 searches the route information DB 112 for a segment list that includes the same start-point router and end-point router and that does not pass the optical wavelength path whose ID is 1. The route information in FIG. 6 indicates that A-to-B-2 and B-to-A-2 satisfy the requirements. To change the route of the VPN 1, the optical wavelength defragmentation execution unit 102 issues a request to the router A to change the route that the VPN 1 uses to A-to-B-2 via the router control unit 103. Likewise, the optical wavelength defragmentation execution unit 102 issues a request to the router B to change the route that the VPN 1 uses to B-to-A-2.

In response to the requests from the optical wavelength defragmentation execution unit 103, the router control unit 103 transmits the request to change the route that the VPN 1 uses to A-to-B-2 to the router A. Likewise, the router control unit 103 transmits the request to change the route that the VPN 1 uses to B-to-A-2 to the router B. In this way, the route of the VPN 1 is changed to a route whose optical wavelength path ID is 3. The similar processing is repeatedly performed until the routes of all the services that pass through the optical wavelength path which is the wavelength defragmentation target.

Next, λ1 is changed to λ2 in the section between the transmission apparatus A and the transmission apparatus B. The optical wavelength defragmentation execution unit 102 issues a request to each of the transmission apparatus A and the transmission apparatus B to change the wavelength band of the optical wavelength path whose ID is 1 from λ1 to λ2 via the transmission apparatus control unit 104.

In response to the requests from the optical wavelength defragmentation execution unit 102, the transmission apparatus control unit 104 transmits the request to change λ1 to λ2 to each of the transmission apparatus A and the transmission apparatus B. Accordingly, λ1 is changed to λ2 in the section between the transmission apparatus A and the transmission apparatus B. When the transmission apparatus control unit 104 has changed λ1 to λ2, the optical wavelength defragmentation execution unit 102 updates information in the transmission configuration information DB 113 by changing the wavelength band of the optical wavelength path ID=1 from λ1 to λ2.

Finally, to switch the route of the VPN 1, which has been temporarily changed, back to the original route, the optical wavelength defragmentation execution unit 102 issues a request to the router A to change the route that the VPN 1 uses to A-to-B-1 via the router control unit 103. Likewise, the optical wavelength defragmentation execution unit 102 issues a request to the router B to change the route that the VPN 1 uses to B-to-A-1.

In response to the requests from the optical wavelength defragmentation execution unit 102, the router control unit 103 transmits the request to change the route that the VPN 1 uses to A-to-B-1 to the router A. Likewise, the router control unit 103 transmits the request to change the route that the VPN 1 uses to B-to-A-1 to the router B.

Second Embodiment

In a second embodiment, an SDN controller/NMS 100 manages a bandwidth used by a service and a bandwidth of an individual route of a router. In addition, when the route is temporarily changed for executing the optical wavelength defragmentation, the SDN controller/NMS 100 checks that the route to which the service is rerouted has a sufficient bandwidth needed for the service. In this way, the SDN controller/NMS 100 prevents deterioration in communication quality such as a packet loss due to a bandwidth shortage.

In addition to the first embodiment, as illustrated in FIG. 8, the SDN controller/NMS 100 further includes a bandwidth information DB 114 as a storage unit.

The bandwidth information DB 114 manages an available bandwidth or each route set between the routers. For example, the bandwidth information DB 114 holds a bandwidth of a line identified by the corresponding SID as illustrated in FIG. 9 and an available bandwidth (or a bandwidth being used). In addition, as illustrated in FIG. 10, a service information DB 111 holds a bandwidth used by a service, in addition to the segment lists used by the service. The bandwidth of the line may be the maximum available bandwidth set at the time of designing the network. The bandwidth used by the service may be a contract bandwidth for the service. The available bandwidth of the line may be a bandwidth obtained by subtracting the bandwidth used by the service using the line from the maximum available bandwidth.

As in the first embodiment, the present embodiment will be described by using an example in which λ1 is changed to λ2 in a section between the transmission apparatus A and the transmission apparatus B.

As execution procedures of the optical wavelength defragmentation, as in the first embodiment, an optical wavelength defragmentation execution unit 102 searches a transmission configuration information DB 113 for an optical wavelength path whose wavelength band has been requested to be changed and specifies a service using the searched optical wavelength path from data in a route information DB 112 and the service information DB 111. As in the first embodiment, a VPN 1 is specified as the service that would be affected.

In the second embodiment, when the service is moved to a different optical wavelength path to prevent the service from being affected, an optical wavelength path to which the service is rerouted is determined by using the bandwidth used by the service and an available bandwidth of the line. When the available bandwidth of the line of the move-destination route is equal to or more than the bandwidth used by the service, the optical wavelength defragmentation execution unit 102 determines that the service can be detoured to the move-destination route. When the available bandwidth of the line of the move-destination route is less than the bandwidth used by the service, the communication quality becomes poor when the service is detoured to the move-destination route. Thus, it is determined that detouring to the move-destination route is impossible and another route is searched for. Since the bandwidth used by the VPN 1 is 1G as illustrated in FIG. 10, the route is changed to a different optical wavelength path having an available bandwidth of 1G or more. Specifically, the optical wavelength defragmentation execution unit 102 searches the route information DB 112 for a segment list that includes the same start-point router and end-point router and that does not pass through the optical wavelength path whose ID is 1. The route information in FIG. 6 indicates that A-to-B-2 and B-to-A-2 satisfy the requirements. Furthermore, the optical wavelength defragmentation execution unit 102 acquires the available bandwidth of the segment list 101 (SID=101) used from the bandwidth information in FIG. 9. Since the segment list 101 has the available bandwidth of 5G while the bandwidth used by the VPN 1 is 1G, the line bandwidth is determined to be sufficient. To change the route of the VPN 1, the optical wavelength defragmentation execution unit 102 issues a request to the router A to change the route that the VPN 1 uses to A-to-B-2 via router control unit 103. Likewise, the optical wavelength defragmentation execution unit 102 issues a request to the router B to change the route that the VPN 1 uses to B-to-A-2. Accordingly, the route of the VPN 1 is changed to the route whose optical wavelength path ID is 3. The same processing is repeatedly performed until the routes of all the services that pass through the optical wavelength path which is the wavelength defragmentation target.

Next, λ1 is changed to λ2 in the section between the transmission apparatus A and the transmission apparatus B. The optical wavelength defragmentation execution unit 102 issues a request to each of the transmission apparatus A and the transmission apparatus B to change the wavelength band of the optical wavelength path whose ID is 1 from λ1 to λ2 via the transmission apparatus control unit 104.

Finally, to switch the route of the VPN 1, which has been temporarily changed, back to the original route, the optical wavelength defragmentation execution unit 102 issues a request to the router A to change the route that the VPN 1 uses to A-to-B-1 via the router control unit 103. Likewise, the optical wavelength defragmentation execution unit 102 issues a request to the router B to change the route that the VPN 1 uses to B-to-A-1.

Third Embodiment

In the third embodiment, an SDN controller/NMS 100 manages transmission route groups (grouping for distinguishing between a normal route and a backup route) of optical wavelength paths, and when the route is temporarily changed for executing the optical wavelength defragmentation, an optical wavelength path is selected based on the transmission route group so that reliability is ensured. By selecting an optical wavelength path in the same transmission route group when a service is moved to a different optical wavelength path, a move-destination transmission route which is equivalent to the pre-move transmission route in terms of reliability can be selected. Thus, a concept of redundant routes at the time of designing the communication network can be followed.

In addition to the embodiment, a transmission configuration information DB 113 of the SDN controller/NMS 100 holds the transmission route group for each optical wavelength path in the format illustrated in FIG. 11. The transmission route group is obtained by grouping physical routes through which transmission lines pass. For example, routes from Tokyo to Nagano can be grouped by distinguishing between a normal route via Yamanashi and a backup route via Karuizawa. Quality requirements for the normal route, such as a bandwidth and a delay, may be different from quality requirements for the backup route. For the purpose of providing disaster countermeasures or the like, a transmission line by a different route is commonly established in a communication network. Accordingly, the redundant routes are secured by explicitly managing the normal paths and backup paths in the transmission configuration information DB 113. For example, "1" indicates that the transmission route is a normal route, and "2" indicates that the transmission route is a backup route.

As execution procedures of the optical wavelength defragmentation, as in the first embodiment, an optical wavelength defragmentation execution unit 102 searches the transmission configuration information DB 113 for an optical wavelength path whose wavelength band has been requested to be changed and specifies a service using the searched optical wavelength path from data in a route information DB 112 and a service information DB 111. As in the first embodiment, a VPN 1 is specified as the service that would be affected.

In addition, the optical wavelength defragmentation execution unit 102 searches the route information DB 112 for a segment list that includes the same start-point router and end-point router and that does not pass through the optical wavelength path whose ID is 1. The route information in FIG. 6 indicates that A-to-B-2 and B-to-A-2 satisfy the requirements and that the corresponding optical wavelength path ID is 3. Furthermore, the optical wavelength defragmentation execution unit 102 acquires a transmission route group that corresponds to the optical wavelength path ID of 3 from the transmission configuration information in FIG. 11. The transmission route group that corresponds to the optical wavelength path ID of 3 is a transmission route group 1, which is different from a transmission route group 2 that corresponds to the optical wavelength path ID of 1 whose wavelength band has been requested to be changed. Since the transmission route groups are different, the optical wavelength defragmentation execution unit 102 may determine that the route that the VPN 1 uses cannot be changed to A-to-B-2 and B-to-A-2. However, when the quality requirements for the normal route are higher than those for the backup route and the reliability can be ensured even if the backup route is changed to the normal route, the optical wavelength defragmentation execution unit 102 may determine that the backup route that the VPN 1 uses can be changed to the normal route, which is A-to-B-2 and B-to-A-2. In this case, as in the first embodiment, the route of the VPN 1 is changed to the route corresponding to the optical wavelength path ID of 3, and the optical wavelength defragmentation is executed.

Hardware Configuration Example

FIG. 12 illustrates an example of a hardware configuration of the SDN controller/NMS 100 according to the embodiments of the present invention. The SDN controller/NMS 100 may be a computer including a processor such as a CPU (Central Processing Unit) 151, a memory device 152 such as a RAM (Random Access Memory) and a ROM (Read-Only Memory), storage device 153 such as a hard disk, and the like. For example, the functions and processing of the SDN controller/NMS 100 are realized by the CPU 151 executing data and programs stored in the storage device 153 or the memory device 152. In addition, the data may be input to the SDN controller/NMS 100 through the input/output interface apparatus 154, and the data may be output from the SDN controller/NMS 100 through the input/output interface apparatus 154.

Supplement

For convenience of description, the apparatuses according to the embodiments of the present invention are described by using the functional block diagrams. However, the apparatuses according to the embodiments of the present invention may be realized by hardware, software, or a combination thereof. For example, the embodiments of the present invention may be realized by a program for causing a computer to realize the functions of the apparatuses according to the embodiments of the present invention, a program for causing a computer to execute each procedure of the method according to the embodiments of the present invention, and the like. In addition, the functional units may be used as needed. In addition, the method according to the embodiments of the present invention may be performed in a different order from the order described in the embodiments.

The method for realizing the optical wavelength defragmentation without the need to provide a special function such as replicating a signal in the transmission apparatus has thus been described. However, the present invention is not limited to the above embodiments, and various modifications and applications may be made within the scope of the claims.

REFERENCE SIGNS LIST

100 SDN controller/NMS
101 Request reception unit
102 Optical wavelength defragmentation execution unit
103 Router control unit
104 Transmission apparatus control unit
111 Service information DB
112 Router information DB
113 Transmission configuration information DB
114 Bandwidth information DB

The invention claimed is:

1. A control apparatus that is used in a communication network including a plurality of routers and a plurality of transmission apparatuses for connecting between the plurality of routers, the control apparatus comprising:
   an optical wavelength change control unit, including one or more processors, configured to identify, in response to a request to change a wavelength band of a first optical wavelength path used by a first transmission apparatus and a second transmission apparatus among the plurality of transmission apparatuses to a wavelength band of a second optical wavelength path, a first route between routers which is affected by the request and a particular service which uses the first route, and configured to determine a second route between the routers which detours the particular service;
   a router control unit, including one or more processors, configured to transmit a request to detour the particular service to the second route, to a start-point router and an end-point router on the first route among the plurality of routers; and
   a transmission apparatus control unit, including one or more processors, configured to transmit a request to change the wavelength band of the first optical wavelength path to the wavelength band of the second optical wavelength path, to the first transmission apparatus and the second transmission apparatus.

2. The control apparatus according to claim 1, wherein, when the wavelength band of the first optical wavelength path has been changed to the wavelength band of the second optical wavelength path in the first transmission apparatus and the second transmission apparatus, the router control unit is configured to transmit a request to switch the second route of the particular service back to the first route to the start-point router and the end-point router on the first route.

3. The control apparatus according to claim 1, further comprising: a service information storage unit configured to manage a route set between routers and a correspondence between a service using the route and the route; a route information storage unit configured to manage a correspondence between a route set between routers and an optical wavelength path used on the route; and a transmission configuration information storage unit configured to manage information about an optical wavelength path set between transmission apparatuses, wherein the optical wavelength change control unit is configured to identify the first route between routers which is affected by the request by referring to the transmission configuration information storage unit and the route information storage unit, identify the particular service which uses the first route by referring to the service information storage unit, and determine the second route between the routers which detours the particular service by referring to the route information storage unit.

4. The control apparatus according to claim 1, wherein, based on a used bandwidth set per service and an available bandwidth per route set between routers, when an available bandwidth of the second route is equal to or more than the used bandwidth of the particular service using the first route, the optical wavelength change control unit is configured to determine to detour the particular service to the second route.

5. The control apparatus according to claim 1, wherein the optical wavelength change control unit is configured to determine the second route based on whether the first route is a normal route or a backup route.

6. A control method executed by a control apparatus that is used in a communication network including a plurality of routers and a plurality of transmission apparatuses for connecting between the plurality of routers, the control method comprising:
   identifying, in response to a request to change a wavelength band of a first optical wavelength path used by a first transmission apparatus and a second transmission apparatus among the plurality of transmission apparatuses to a wavelength band of a second optical wavelength path, a first route between routers which is affected by the request and a particular service which uses the first route, and determining a second route between the routers which detours the particular service;
   transmitting a request to detour the particular service to the second route, to a start-point router and an end-point router on the first route among the plurality of routers; and
   transmitting a request to change the wavelength band of the first optical wavelength path to the wavelength band of the second optical wavelength path, to the first transmission apparatus and the second transmission apparatus.

7. The control method according to claim 6, wherein, when the wavelength band of the first optical wavelength path has been changed to the wavelength band of the second optical wavelength path in the first transmission apparatus and the second transmission apparatus, the router control unit transmits a request to switch the second route of the particular service back to the first route to the start-point router and the end-point router on the first route.

8. The control method according to claim 6, further comprising:
   managing, by a service information storage unit of the control apparatus, a route set between routers and a correspondence between a service using the route and the route;
   managing, by a route information storage unit of the control apparatus, a correspondence between a route set between routers and an optical wavelength path used on the route;
   and managing, by a transmission configuration information storage unit, information about an optical wavelength path set between transmission apparatuses, wherein identifying the first route comprises:
- referring to the transmission configuration information storage unit and the route information storage unit, and identifying the particular service which uses the first route by referring to the service information storage unit, and
- determining the second route comprises determining the second route between the routers which detours the particular service by referring to the route information storage unit.

9. The control method according to claim 6, further comprising, based on a used bandwidth set per service and an available bandwidth per route set between routers, when an available bandwidth of the second route is equal to or more than the used bandwidth of the service using the first route, determining to detour the particular service to the second route.

10. The control method according to claim 6, wherein determining the second route comprises determining the second route based on whether the first route is a normal route or a backup route.

* * * * *